Patented June 17, 1952

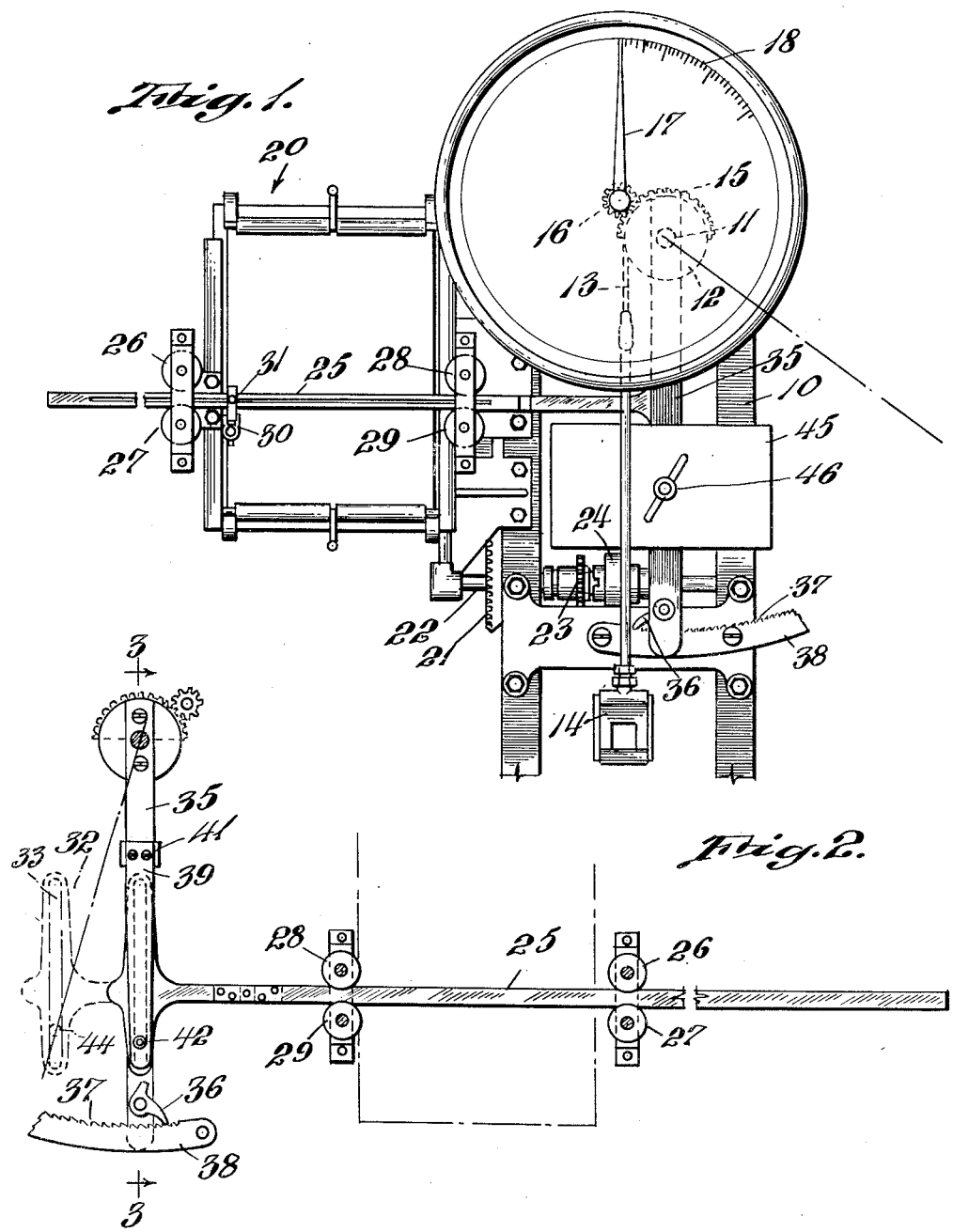

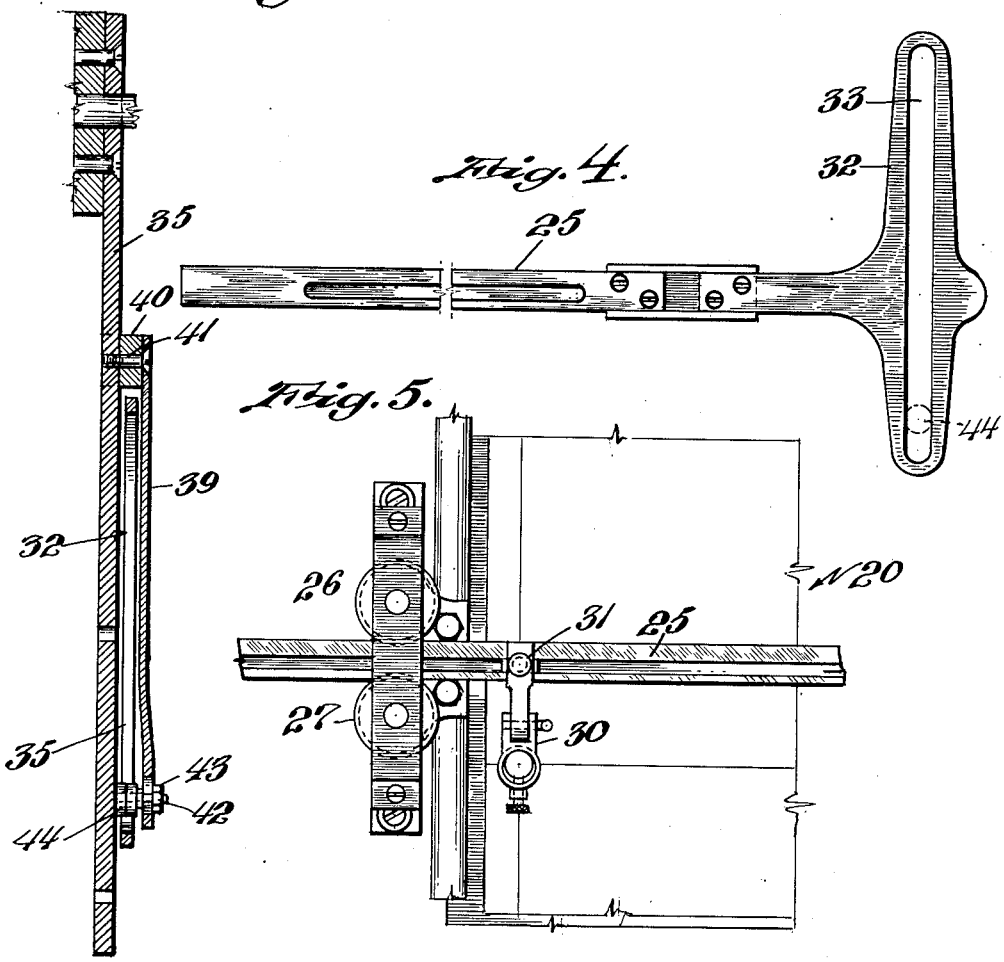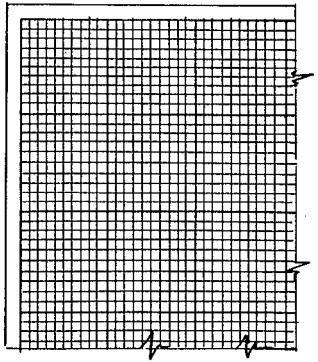

2,601,130

UNITED STATES PATENT OFFICE 2,601,130

TESTING MACHINE MARKING MEANS

David C. Scott, Providence, and Frank A. Valentine, Apponaug, R. I., assignors to Scott Testers, Inc., a corporation of Rhode Island Application February 27, 1947, Serial No. 731,357

4 Claims. (Cl. 73—98)

This invention relates to a testing machine and more particularly to the movement of the marking instrument across the recording chart.

In the use of a testing machine which has a recording chart, such as illustrated in Patent No. 1,679,751, dated August 7, 1928, where the marking instrument is moved by a link connecting it to a swinging lever arm, there will be a variation in the horizontal movement of the marking instrument so that movement of the weight to apply unit increments of resistance will result in uneven increments of movement of the pen. Further, the dial over which the indicating pointer moves must be marked by increasing spacings which must be mathematically laid out about the circle over which the dial operates.

One of the objects of this invention is to provide a mechanical correction to this uneven condition of movement of pen in response to the movement of the load so that there will be uniform movement of the marking instrument on the recording chart for uniform increments of resistance applied to the specimen being tested so that a graph may be made from the chart in which the ordinates and abscissas are each equal.

Another object of this invention is to provide for the recording of a test so that the chart may have an even horizontal spacing in accordance with the load applied without correction or mathematical computation in order that this may be accomplished.

More specifically an object of this invention is to cause the line of effort, as indicated by the angular movement of a pendulum, to be corrected to a straight line instead of a parabola along which the line of effort would normally extend when connected by a link from the swinging pendulum.

Another object of this invention is to provide by reason of the uniform increments on the recording chart a simpler method of laying out the dial reading on the machine.

With these and other objects in view, the invention consists of certain novel features of construction as will be more fully described and particularly pointed out in the appended claims.

In the accompanying drawings:

Fig. 1 is a view of the upper portion of a testing machine in which this invention is applied;

Fig. 2 is an enlarged view looking at the rear of the weight carrying pendulum arm and the rod which is actuated by the pendulum arm for moving the marking instrument over the platen;

Fig. 3 is a section on line 3—3 of Fig. 2;

Fig. 4 is a view of a bar with a slotted head at one end which is used for transmitting motion from the swinging lever to the writing instrument;

Fig. 5 is an elevational view of a fragmental portion of the recording chart platen and parts associated therewith as shown in Fig. 1;

Fig. 6 is a face view of a chart showing uniform increments which will be used in this machine.

In proceeding with this invention, instead of connecting the marking instrument directly to the weight lever by a link, we utilize a rigid rod with a slotted head at one end which may receive a pin on the weight arm so that as the weight arm swings from a vertical position about a pivot at its upper end, the pin will slide in this slot and cause a movement of the rigid rod in accordance with the sine of the angle which is made by the arm and a vertical from its pivot which causes a correction of the movement of the writing instrument so that its movement will be proportional to the load applied, which load is applied in direct proportion to the sine of the angle which the arm on which it is mounted makes with a vertical.

With reference to the drawings, 10 designates a suitable frame which has a shaft 11 rotatably mounted thereon, there being a drum 12 on this shaft over which there is trained a flexible strap 13 which is connected to the upper specimen clamp 14 in a manner similar to that more fully set forth in the above-mentioned Patent No. 1,679,751. Gear teeth 15 mesh with the pinion gear 16 which carries a pointer 17 to move over the dial 18 and visually indicate the load applied. A platen designated generally 20 is given vertical movement along tracks by which it is guided by means of a train of gears one of which is indicated at 21 on the rotary shaft 22 which is driven through gear 23 and clutch 24.

A rod 25 is guided by means of rolls 26 and 27 at one side of the platen and 28 and 29 on the other side of the platen. This rod carries the marking instrument 30 which may be adjustably secured on this rod by means of clamp screw 31. A head 32 is secured at one end of the rod 25 which head is slotted as at 33 at right angles to the rod 25.

A weight lever 35 is secured to the shaft 11 to extend vertically downward, as shown in Figs. 1 and 2, while at its lower end there are a plurality of pawls 36 to engage the teeth 37 on the arcuate member 38 to hold the lever 35 in the position to which it has been swung by a pull on the specimen which is attached to the clamp 14. On the back of the lever 35, there is a member 39 which is carried in spaced relation by means of the block 40 and the screw 41 which member carries at its lower end a pin 42 held in position by the nut 43, and the pin carries a roll 44 to extend into the slot 33 of the head 32.

A weight 45 is adjustably secured along the lever arm 35 by means of the thumb nut 46 which engages a slot in the lever arm 35 by reason of a T head.

It will be apparent that as pull occurs on the clamp 14, the drum 12 will be rotated so as to swing the lever arm 35 about the axis of the shaft 11 upwardly to the right as shown in Fig. 1, the weight resisting such movement. The swinging movement of the lever, however, will transmit through the pin and slot connection movement to the bar 25 to move the marking instrument 30 across the recording chart in a horizontal line which will be in uniform increments in accordance with the load applied. Thus, as movement of the chart is directed vertically in equal increments, there will be formed a curve which will be symmetrical in accordance with a square graph.

We have found that by using the slot and pin connection between the weight lever and the chart that the load will vary in uniform increments horizontally from left to right as the lever swings about its pivot. Heretofore, with the lever connected by a link to the scribing instrument over the chart uneven increments on the chart were necessary to record the values of the load applied. The pointer 17 does not move equally for equal increments of load applied and, consequently, the spacings on the dial 18 required considerable mathematical calculation before they were placed upon the dial. By the use of a chart having uniform horizontal increments, this chart may be positioned, and then by swinging the lever with its weight so that the scribe or marker 31 registers with these different equal increments, the pointer 17 itself may be utilized for the location of the different spacings of the markers 18 on the dial which very much reduces the time consumed in the laying out of an accurate reading on the dial.

We claim:

1. In a testing machine, a platen for a recording chart having uniform spacings thereon, guide tracks to direct the movement of said platen, a marking instrument to mark on said chart, a member carrying said instrument, means to direct the movement of said member at right angles to the movement of said platen, a lever movable about a pivot in response to a load applied, said member having a straight slot at right angles to the movement of said instrument, and a pin carried by said lever and entering said slot to move said instrument across said platen in uniform increments in accordance with the load applied.

2. In a testing machine as in claim 1 wherein said pin carries a roll to engage the edges of said slot.

3. In a testing machine, a platen for a recording chart having uniform spacings thereon, guide tracks to direct the movement of said platen, a marking instrument to mark on said chart, means including a bar connected to said instrument to direct the movement thereof at right angles to the movement of said platen, a lever movable about a pivot in response to the load applied, said bar having a cross head with a straight slot therein extending in a direction at right angles to the line of movement of said instrument and a pin on said lever in said slot to move the bar and in turn said instrument in uniform increments in accordance with the load applied.

4. In a testing machine as in claim 3 wherein said pin carries a roll to engage the edges of said slot.

DAVID C. SCOTT.
FRANK A. VALENTINE.

REFERENCES CITED

The following references are of record in the file of this patent:

UNITED STATES PATENTS

| Number | Name | Date |
|---|---|---|
| 543,768 | Haag | July 30, 1895 |
| 748,236 | Tuvell | Dec. 29, 1903 |
| 1,679,751 | Stevenson | Aug. 7, 1928 |